United States Patent
Bowden

(10) Patent No.: US 10,321,399 B1
(45) Date of Patent: Jun. 11, 2019

(54) ACTIVATING A FUNCTION IN RESPONSE TO SENSOR READINGS

(71) Applicant: Cambridge Software, Inc., San Francisco, CA (US)

(72) Inventor: Bruno Bowden, San Francisco, CA (US)

(73) Assignee: Cambridge Software, Inc., San Francisco, CA (US)

(*) Notice: Subject to any disclaimer, the term of this patent is extended or adjusted under 35 U.S.C. 154(b) by 126 days.

(21) Appl. No.: 15/486,288

(22) Filed: Apr. 12, 2017

Related U.S. Application Data

(60) Provisional application No. 62/322,124, filed on Apr. 13, 2016.

(51) Int. Cl.
*H04W 4/12* (2009.01)
*H04W 4/60* (2018.01)
*H04W 52/02* (2009.01)

(52) U.S. Cl.
CPC ......... *H04W 52/0229* (2013.01); *H04W 4/60* (2018.02); *H04W 4/12* (2013.01)

(58) Field of Classification Search
CPC ... H04W 52/0229; H04W 4/60; H04W 4/003; H04W 4/12
See application file for complete search history.

(56) References Cited

U.S. PATENT DOCUMENTS

| | | | | |
|---|---|---|---|---|
| 2012/0265604 A1* | 10/2012 | Corner | .................... | H04W 4/21 705/14.39 |
| 2013/0282421 A1* | 10/2013 | Graff | .................. | G06Q 10/1093 705/7.18 |
| 2014/0106710 A1* | 4/2014 | Rodriguez | .......... | H04M 1/7253 455/411 |
| 2015/0264169 A1* | 9/2015 | Yim | .................. | H04M 1/72563 455/411 |
| 2015/0318874 A1* | 11/2015 | Donaldson | .............. | H04W 4/21 367/135 |

OTHER PUBLICATIONS

Author Unknown, Bump (Application), Wikipedia, Nov. 11, 2016, http://web.archive.org/web/20161129194950/https://en.wikipedia.org/wiki/Bump_(application).
Teschler, The Difference Between Microprocessors and Application Processors, Microcontroller Tips, Aug. 9, 2016, http://www.microcontrollertips.com/difference-microprocessors-application-processors/.
Author Unknown, Bump for iPhone Review, Youtube Transcript, Uploaded on Jan. 22, 2011.

* cited by examiner

*Primary Examiner* — Lewis G West
(74) *Attorney, Agent, or Firm* — Van Pelt, Yi & James LLP

(57) ABSTRACT

In various embodiments, a method for determining a match between two devices includes receiving sensor data from a first device and a second device, determining whether the sensor data indicates a match between the first and second devices. If there is a match between the first and second devices, the match is confirmed. The match is confirmed based on at least one of: at least one knock, analysis of missing information and a characteristic of a user of the first device or a user of the second device. In various embodiments, a method of activating a function includes receiving sensor reading(s), analyzing the sensor reading(s) including determining whether at least one knock has occurred based on the sensor reading(s), determining whether to activate the function based on the analysis. If the function should be activated, the function is activated.

18 Claims, 9 Drawing Sheets

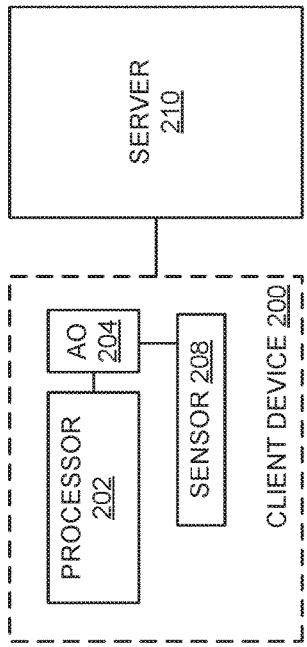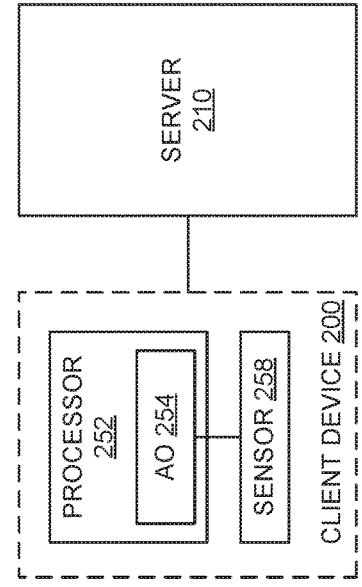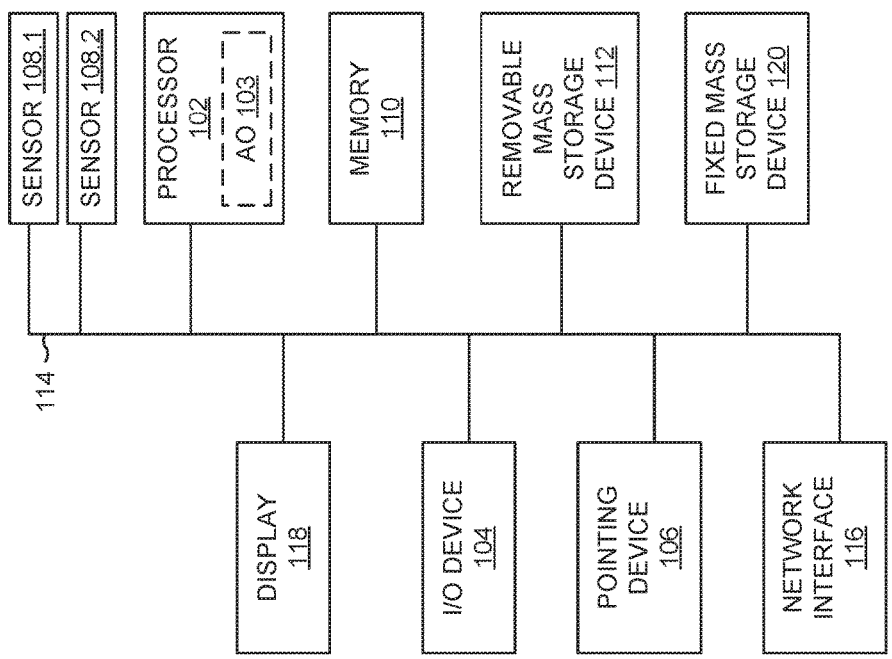

300

400

700

800

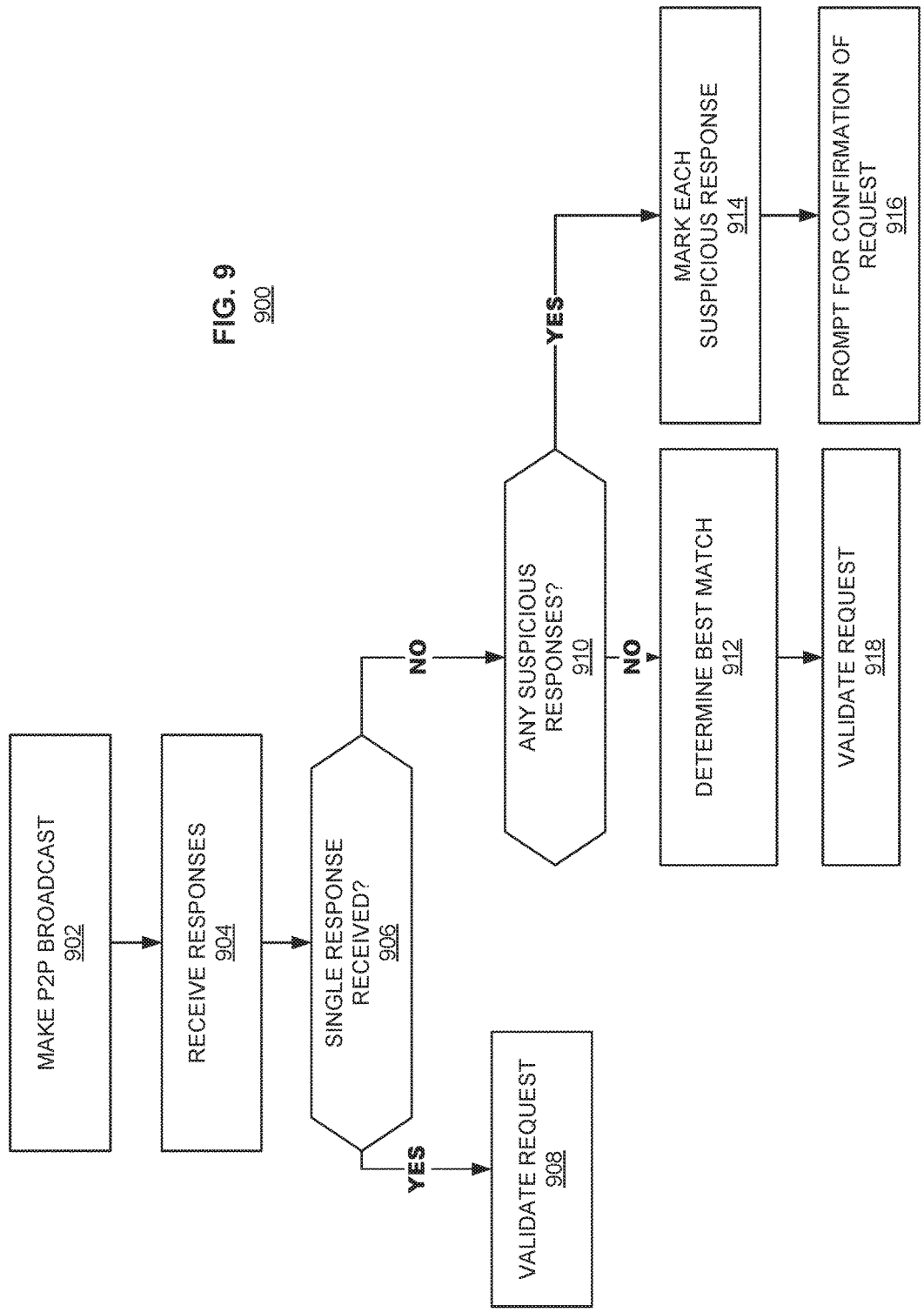

1000

ACTIVATING A FUNCTION IN RESPONSE TO SENSOR READINGS

CROSS REFERENCE TO OTHER APPLICATIONS

This application claims priority to U.S. Provisional Patent Application No. 62/322,124 entitled WAKING A PROCESSOR ON A DEVICE filed Apr. 13, 2016 which is incorporated herein by reference for all purposes.

BACKGROUND OF THE INVENTION

As mobile devices become more popular and useful, they are used frequently for varied purposes. A typical mobile device has limited battery life and frequent use, especially of battery-intensive applications, cause the battery to be drained quickly and limits the usefulness of the mobile device. Conventional techniques to conserve battery life include dimming or turning off the display of the mobile device when the user is not using the display. To protect the contents of the mobile device, the device is typically password protected. For example, when a device is turned on or woken up, a lock screen is displayed and a user enters a password to access the contents of the mobile device protected by the lock screen.

In one aspect, conventional methods of waking a processor on a device are not power efficient. For example, a display is inadvertently turned on or a device is unintentionally woken up. In another aspect, conventional means of wirelessly exchanging information using mobile devices are sometimes insecure and often cumbersome and inconvenient. For example, to use a functionality (e.g., an application) on the mobile device, the user wakes a processor on a device by unlocking the device and opening the application. The steps of waking and/or unlocking a device can be inefficient and tedious, especially when repeated within a short period of time.

BRIEF DESCRIPTION OF THE DRAWINGS

Various embodiments of the invention are disclosed in the following detailed description and the accompanying drawings.

FIG. 1 is a functional diagram illustrating a programmed computer system for waking a processor on a device in accordance with some embodiments.

FIG. 2A is a block diagram illustrating an embodiment of a system for waking a processor on a device, in which the system includes a discrete AO.

FIG. 2B is a block diagram illustrating an embodiment of a system for waking a processor on a device, in which the system includes an integrated AO.

FIG. 9 is a flow chart illustrating an embodiment of a process for preventing a technological attack.

DETAILED DESCRIPTION

Figure 3:
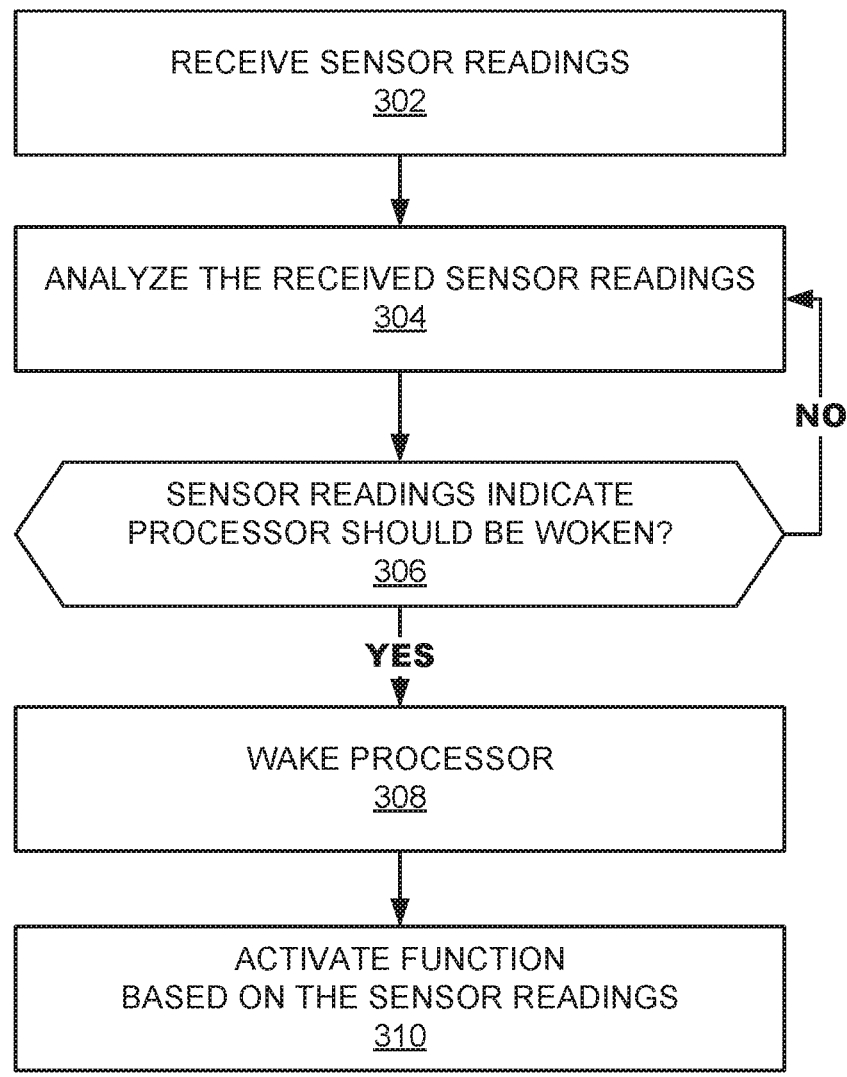
FIG. 3 is a flow chart illustrating an embodiment of a process for waking a processor and activating a function.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system and method for an always-on processor response to outlier sensor readings is disclosed. In various embodiments, at least one sensor reading is received. The at least one sensor reading is analyzed, where the analysis includes determining whether at least one knock has occurred based on the received at least one sensor reading. It is determined whether to activate a function based on the analysis. If the function should be activated, the function is activated. In some embodiments, the activated function is on an always-on processor. In some embodiments, the activated function includes waking a processor and performing a function.

In various embodiments, a processor is woken and a functionality for a user to unlock or turn on the device is activated. Upon waking up, a function on the processor is activated based on the type of trigger received. The processor on a device is woken efficiently. For example, the incidence of false wakes (when a processor is unintentionally woken up) is reduced by more effectively recognizing a user's intention to wake a device.

Consider a situation in which a mobile device user is attending a conference and wishes to network with fellow conference attendees. Traditionally, conference attendees exchange contact information by exchanging business cards.

With the growing popularity of mobile devices, the conference attendees might exchange contact information by storing the information on mobile devices. Conventional techniques of exchanging contact information using a mobile device typically involve waking the device, launching an application on the device, and manually inputting information from the new acquaintance. This process interrupts the natural flow of conversation and can be inefficient and tedious.

The techniques described herein may facilitate this type of transaction by matching people (e.g., device users) by recognizing when devices make physical contact. For example, a first person "knocks" her mobile phone against the mobile phone belonging to a second person. The "knock" may trigger a match and exchange contact information, as further described herein. The match can be used for making a social connection, contact exchange, or to record when and where a social connection was first made. For example, the social connection may be a friend or business connection and may be a social graph connection such as Facebook® or LinkedIn® contact. Unlike conventional information sharing mechanisms, the device need not be turned on, unlocked, and/or have an opened app on the device to share information or to trigger an emergency alert.

In various embodiments, an emergency alert is triggered when a device is knocked a number of times meeting a threshold. In response to detecting an emergency and waking a processor, a notification of the emergency may be sent. An app need not be opened and a device need not be unlocked or even turned on to send the emergency alert.

FIG. 1 is a functional diagram illustrating a programmed computer system for waking a processor on a device in accordance with some embodiments. As will be apparent, other computer system architectures and configurations can be used to perform the described processor waking technique. Computer system 100, which includes various subsystems as described below, includes at least one processing subsystem (also referred to as a processor or a central processing unit (CPU) 102). The processing subsystem may be a microprocessor subsystem or an application processor subsystem. For example, processor 102 can be implemented by a single-chip processor or by multiple processors. In some embodiments, processor 102 is a general purpose digital processor that controls the operation of the computer system 100. In some embodiments, processor 102 also includes one or more coprocessors or special purpose processors (e.g., a graphics processor, a network processor, a broadband processor, etc.). This combined entity is referred to as an "Application Processor." Using instructions retrieved from memory 110, processor 102 controls the reception and manipulation of input data received on an input device (e.g., pointing device 106, I/O device interface 104), and the output and display of data on output devices (e.g., display 118).

Processor 102 is coupled bi-directionally with memory 110, which can include, for example, one or more random access memories (RAM) and/or one or more read-only memories (ROM). As is well known in the art, memory 110 can be used as a general storage area, a temporary (e.g., scratch pad) memory, and/or a cache memory. Memory 110 can also be used to store input data and processed data, as well as to store programming instructions and data, in the form of data objects and text objects, in addition to other data and instructions for processes operating on processor 102. Also as is well known in the art, memory 110 typically includes basic operating instructions, program code, data, and objects used by the processor 102 to perform its functions (e.g., programmed instructions). For example, memory 110 can include any suitable computer readable storage media described below, depending on whether, for example, data access needs to be bi-directional or uni-directional. For example, processor 102 can also directly and very rapidly retrieve and store frequently needed data in a cache memory included in memory 110.

In a conventional system, using the processor to perform tasks can be power intensive. For example, if the processor is forced to stay awake to perform various tasks with immediate response, the processor may consume a significant amount of power. Depending on the tasks continuously performed, the various tasks may drain at least half of the device's battery within a matter of hours. This naturally prevents all-day use of the device.

In various embodiments, the processor includes an always-on processor (AO) 103. The AO assists the processor with tasks to reduce power consumption. The "processor" (sometimes referenced herein as an "application processor") refers to all parts of the chip that are not continuously operating in an "always-on" mode. In some embodiments, the AO is part of the Application Processor. For example, the Apple® M9 motion coprocessor chip is embedded on the die of the A9 application processor. Some Qualcomm Snapdragon® chips are also configured similarly. To conserve power during sleep, typically a "power island" wakes up a minimal part of the application processor to do the always-on processing. The AO can then wakeup the rest of the application processor if merited.

The AO may be implemented by low power processors such as an ARM core, a DSP or other system. Examples of AO systems include the Motion Coprocessor (used by Apple®) and the Sensor Hub (used by Android®). They are typically used for fitness apps that require 24 hour monitoring, such as a step counter. The AO may be implemented by various components.

The AO may be implemented as an element integrated with the processor or as an element separate from the processor. An example of a system having a stand-alone AO is shown in FIG. 2A. An example of system having an integrated AO is shown in FIG. 2B. For the purposes of this disclosure, the techniques described herein find application for an AO implemented as a distinct chip or implemented as an integrated part of the application processor. That is, the "always-on" processor may be implemented as a distinct chip or part of the application processor.

Figure 8:
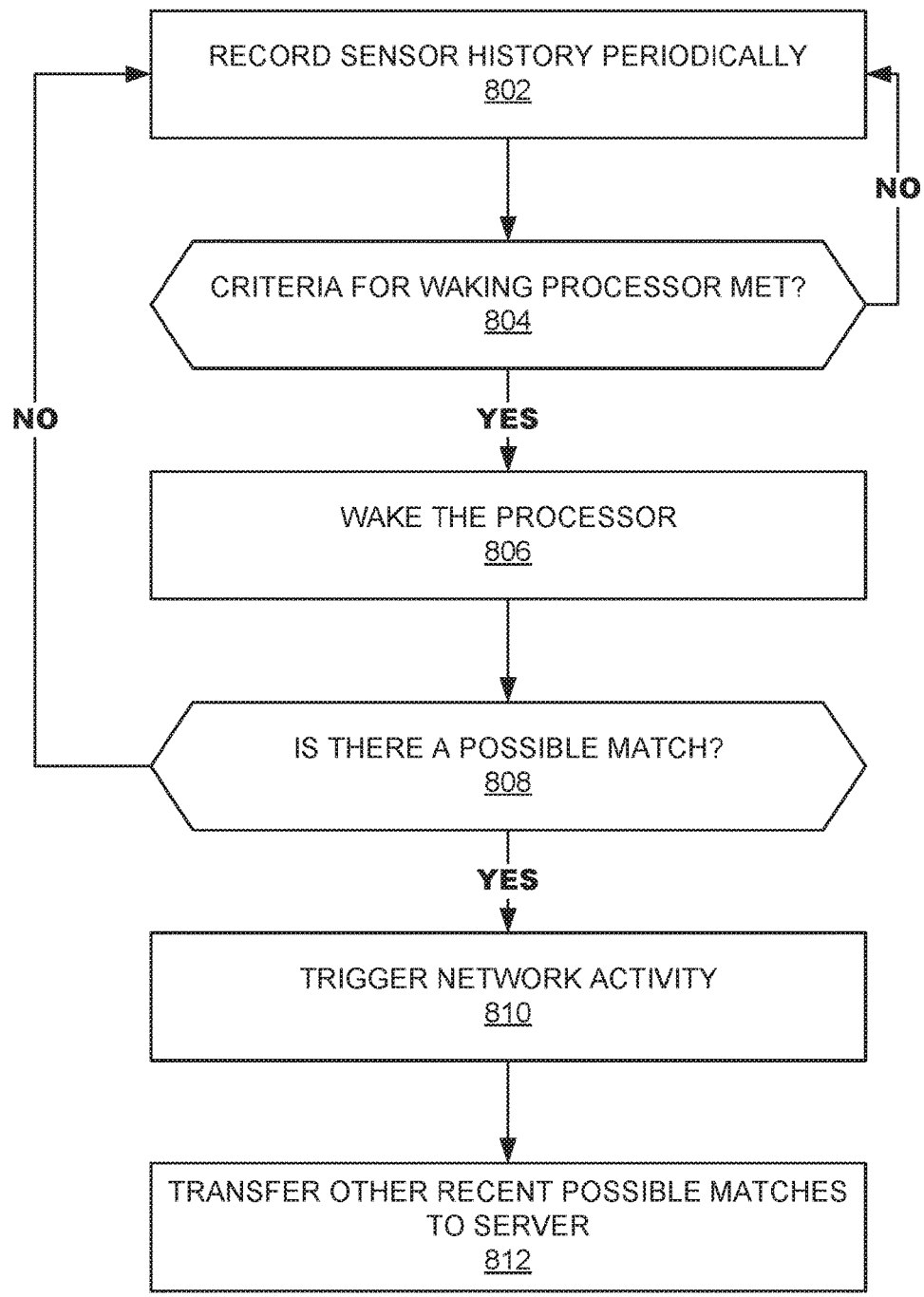
FIG. 8 is a flow chart illustrating an embodiment of a process for waking a processor in a device without an always-on processor.

The techniques described herein also find application in devices without an AO. For example, devices may support sensor history (e.g., historical accelerometer history) that can be analyzed by the application processor when the device is awake. The techniques described herein can be performed on the historical sensor data. FIG. 8 is an example of a process for devices without an AO.

A removable mass storage device 112 provides additional data storage capacity for the computer system 100, and is optionally coupled either bi-directionally (read/write) or uni-directionally (read only) to processor 102. A fixed mass storage 120 can also, for example, provide additional data storage capacity. For example, storage devices 112 and/or 120 can include computer readable media such as magnetic tape, flash memory, PC-CARDS, portable mass storage devices such as hard drives (e.g., magnetic, optical, or solid state drives), holographic storage devices, and other storage devices. Mass storages 112 and/or 120 generally store additional programming instructions, data, and the like that typically are not in active use by the processor 102. It will be appreciated that the information retained within mass storages 112 and 120 can be incorporated, if needed, in standard fashion as part of memory 110 (e.g., RAM) as virtual memory.

In addition to providing processor 102 access to storage subsystems, bus 114 can be used to provide access to other subsystems and devices as well. As shown, these can include a display 118, a network interface 116, an input/output (I/O) device interface 104, an image processing device 106, as well as other subsystems and devices. For example, image processing device 106 can include a camera, a scanner, etc.; I/O device interface 104 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 100. Multiple I/O device interfaces can be used in conjunction with computer system 100. The I/O device interface can include general and customized interfaces that allow the processor 102 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 116 allows processor 102 to be coupled to another computer, computer network, or telecommunications network using a network connection as shown. For example, through the network interface 116, the processor 102 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

In various embodiments, network interface 116 is configured to support various wired and wireless network connections including packet-switched network protocols (e.g., Wi-Fi®), circuit-switched network protocols (e.g., cellular), or a combination thereof. In various embodiments, the network interface is configured to support peer-to-peer communication. Peer-to-peer communication may consume relatively lower levels of power, operate faster, and be more reliable compared with other communications protocols. In various embodiments, the network interface is configured to support several types of communications protocols, adopting a second communications protocol if a first one fails or is inadequate for application purposes. For example, if peer to peer communication fails, then another network connection may be tried (e.g. Wi-Fi® or cellular). Alternatively, multiple communication protocols may be used simultaneously. This may improve the reliability or speed of operation because the device may only need one protocol to be successful. In various embodiments, the devices communicate to a networked server (not shown), over network interface 116.

In various embodiments, network interface 116 assists in identification and authentication of the device. For example, the device communication is signed by the device to authenticate it. The communication may use a zero RTT configuration protocol such as Quick UDP Internet Connection (QUIC). A zero RTT configuration protocol advantageously eliminates numerous back and forth handshakes. Numerous back and forth handshakes are associated with high latency and/or broken connections (e.g., when connectivity is poor).

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 104 and display 118 share the touch sensitive screen component, which both detects user inputs and displays outputs to the user). In addition, bus 114 is illustrative of any interconnection scheme serving to link the subsystems. Other computer architectures having different configurations of subsystems can also be utilized.

The system may include one or more sensors 108.1 and 108.2. In some embodiments, the sensors are configured to detect a knock according to the techniques described herein. Sensors 108.1 and 108.2 may include an accelerometer, a gyroscope, a compass, a proximity sensor, a microphone, an ultrasonic sensor, a near field communications device, and/or other sensors. A "knock" produces a signal that is picked up by the sensors. In various embodiments, a knock is defined by physical contact with a device exceeding a threshold (e.g., an acceleration, pressure, or sound volume threshold).

An accelerometer may be configured to detect a knock when acceleration meets a threshold. The threshold may be an absolute acceleration threshold, a jerk threshold (derivative of acceleration with respect to time or an acceleration slope), and the like. For example, a knock is detected when there is an outlier sensor reading. For example, an outlier sensor reading may be acceleration exceeding an absolute threshold, e.g. 20 m/s^2-2G. As another example, a knock is detected when acceleration slope (known as "jerk") exceeds a threshold, e.g., 1000 m/s^3. In some embodiments, the acceleration slope, which is a rate of change of acceleration, is a better signal. For example, for an expected type of physical contact (e.g., a knock, which is a relatively "sharp" short contact), jerk more accurately triggers knock analysis.

A location sensor may be configured to detect knock based on location and/or change in location of the device. For example, the location sensor may be implemented by a global positioning system (GPS). In various embodiments, location APIs of the device operating system (e.g., a fused location provider that assembles multiple inputs), the first derivative of the location (e.g., velocity), second derivative (e.g., acceleration), and/or third derivative (e.g., jerk) are provided as inputs to threshold comparisons. For example, a knock is detected when acceleration exceeds an absolute threshold, e.g. 20 m/s^2-2G. As another example, a knock is detected when acceleration exceeds a slope (e.g., derivative/jerk) threshold, e.g. 1000 m/s^3.

A gyroscope may be configured to detect a knock when there a change in rotation speed (rotation slope) meets a threshold. The threshold may define a sudden change in rotation speed. For example, a knock is detected when the derivative of rotation speed exceeds a threshold.

A compass may be configured to detect a knock when a magnetic field disturbance meets a threshold. For example, when two metal-containing devices knock each other, the magnetic field is disturbed due to the proximity of the devices to each other.

A sound sensor such as a microphone may be configured to detect a knock when signal characteristics of a sound meets a profile or threshold. The threshold may define a sound spectrum signal (e.g., average volume across a range of frequencies being above a threshold) that is likely to be caused by a physical knock against the device. For instance, the threshold may be a decibel level corresponds to a loud volume signal. For example, a knock is detected when sensed volume exceeds a threshold.

A proximity sensor may be configured to detect a knock when a user approaches the sensor. For example, a proximity sensor detects a face or part of the face such that when a mobile device is used to make a phone call (e.g., the face is close to or pressed to the touch screen), the touch screen is dimmed or turned off to save power and prevent false touches. As another example, the proximity sensor wakes the screen when a user approaches the device. Similarly, a knock is detected when the proximity sensor senses an approach of the user. In some embodiments, an approach of a user or device may be detected by near field communications sensors.

A communications sensor may be configured to detect knock based on distance between two devices. For example, the communications sensor is implemented by a Near Field Communication (NFC) or other close proximity RF communication channel that operates within short distances, e.g. 1-10 cm or less. For example, a knock is detected when a first device and a second device as within a threshold distance from each other.

A distance sensor may be configured to detect a knock when an ultrasonic distance between two devices meets a threshold. The threshold may define a maximum distance, e.g., 10 cm, between two devices for pairing the two devices. When the distance between the two devices exceeds the threshold, they are no longer capable of being paired. For example, a knock is detected when the distance between two devices is less than the threshold.

A relative velocity sensor may be configured to detect a knock when an ultrasonic velocity derivative meets a profile. The ultrasonic velocity derivative is a measure of change in device to device relative speed. When the change in relative speed is sudden, this indicates that a first device is moving quickly toward a second device. An expected profile of the ultrasonic velocity derivative is a first device moving quickly towards a second device followed by a sudden slow down when the devices knock against each other. For example, a knock is detected when sensed relative velocity matches an expected profile.

In some embodiments, processor 102 combines one or more of the example sensor signals to produce an output. For example, processor 102 includes a heuristic or machine learning system that incorporates some or all of the example sensor signals to produce a combined output with greater accuracy than any single signal. Other sensors may be included in the system. Knock detection is further described herein with respect to FIGS. 4 and 5.

The examples described herein refer to a user's device. The user's device may include the system 100. The user's device may be any type of mobile device that is in the possession of the user and includes personal and corporate-issued devices.

FIG. 2A is a block diagram illustrating an embodiment of a system for waking a processor on a device, in which the system includes a discrete AO. FIG. 2B is a block diagram illustrating an embodiment of a system for waking a processor on a device, in which the system includes an integrated AO. System 200 shown in FIG. 2A includes a processor 202, an AO 204, and a sensor 208. In system 200, AO 204 is a discrete component separate from processor 202. System 250 shown in FIG. 2B includes a processor 252, an AO 254, and a sensor 258. In system 250, AO 254 is a component integrated with processor 252.

Each of processors 202 and 252 is a microprocessor subsystem that may be configured to handle various tasks. Processor 102 shown in FIG. 1 is an example of a processor.

Each of AOs 204 and 254 assists a respective processor (202 and 252) with tasks to reduce power consumption. For example, AO remains powered on while the processor is sleeping and wakes the processor when the processor is needed to complete a task. AO 103 shown in FIG. 1 is an example of an AO.

Each of sensors 208 and 258 includes one or more sensors configured to detect a state of a respective system (200 and 250) including external forces on the system. Sensor 108.1 and sensor 108.2 are examples of sensors. Sensor 208, 258 may include an accelerometer, a gyroscope, a compass, a proximity sensor, a microphone, an ultrasonic sensor, a near field communications device, and/or other sensors.

FIG. 3 is a flow chart illustrating an embodiment of a process 300 for waking a processor and activating a function. Process 300 shown in FIG. 3 may be implemented by a device or system such as system 100 shown in FIG. 1, AO 204 shown in FIG. 2A, or AO 254 shown in FIG. 2B.

At 302, the process receives one or more sensor readings. In some embodiments, the sensors are observed in a pre-defined order or hierarchy. For example, the system may operate with a hierarchy of observations, each more power hungry and less frequent. Balancing these levels provides a system that is both reliable and minimizes power drain on the device. By way of non-limiting example, Table 1 outlines the frequency of each step in an example hierarchy. The interval values provided in Table 1 are exemplary approximate values.

TABLE 1

| Order | Sensor Reading | Example Interval |
|---|---|---|
| 1 | Sensor data, e.g., accelerometer report | 0.01 seconds, i.e., 100 hertz |

TABLE 1-continued

| Order | Sensor Reading | Example Interval |
|---|---|---|
| 2 | Analyze data continuously at low power | 0.1 seconds |
| 3 | Single knocks occur randomly, e.g., jostled in pocket | 20 seconds |
| 4 | Multiple knocks occur in sequence randomly and wakes up device | 180 seconds |
| 5 | App reports the more likely intended matches | 1200 seconds |
| 6 | Successful match occurs | 2 weeks |

In various embodiments, the sensor reading includes one or more of the following: raw sensor data with corresponding timestamp, a timestamp of the knocks, other information useful for determining whether a knock has occurred, a location of a device about the person (e.g., in hand, on table, in pocket), a device's interaction status (e.g., turned on, unlocked, on call, interacting with app), a confidence that the detected reading was indeed a knock, a location of the device, a timestamp/calendar, and/or video data captured by the camera of the device, e.g., visual detection of a nearby device and a screen of the nearby device.

At 304, the process analyzes the received sensor readings. In various embodiments, the process may determine one or more of the following: an estimate of offset between device time and atomic time, a location of the device (e.g., relative to a person), a geographic location of the device, information about nearby devices (e.g., based on NFC, Bluetooth® low energy, or other short range communication protocols), and shared contact information between two devices (e.g., if the match attempt is made between people with mutual friends). In various embodiments, the analysis of the received sensor readings including determining whether a knock occurs and/or a number of knocks. Knock determination is further described herein, e.g., with respect to FIGS. 4 and 5.

At 306, the process determines whether the received sensor readings indicate whether the processor should be woken. For example, the processor should be woken if a profile or threshold such as a pattern or number of knocks is met. An example of determining whether a processor should be woken based on sensor readings is described herein with respect to FIG. 4.

If the process determines that the processor should not be woken, the process returns to 304 in which the process analyzes sensor readings. For example, sensor readings may subsequently be received or periodically received and the process may continue to analyze those sensor readings. Otherwise, if the process determines that the processor should be woken, the process proceeds to 308 in which the processor is woken.

Figure 4:
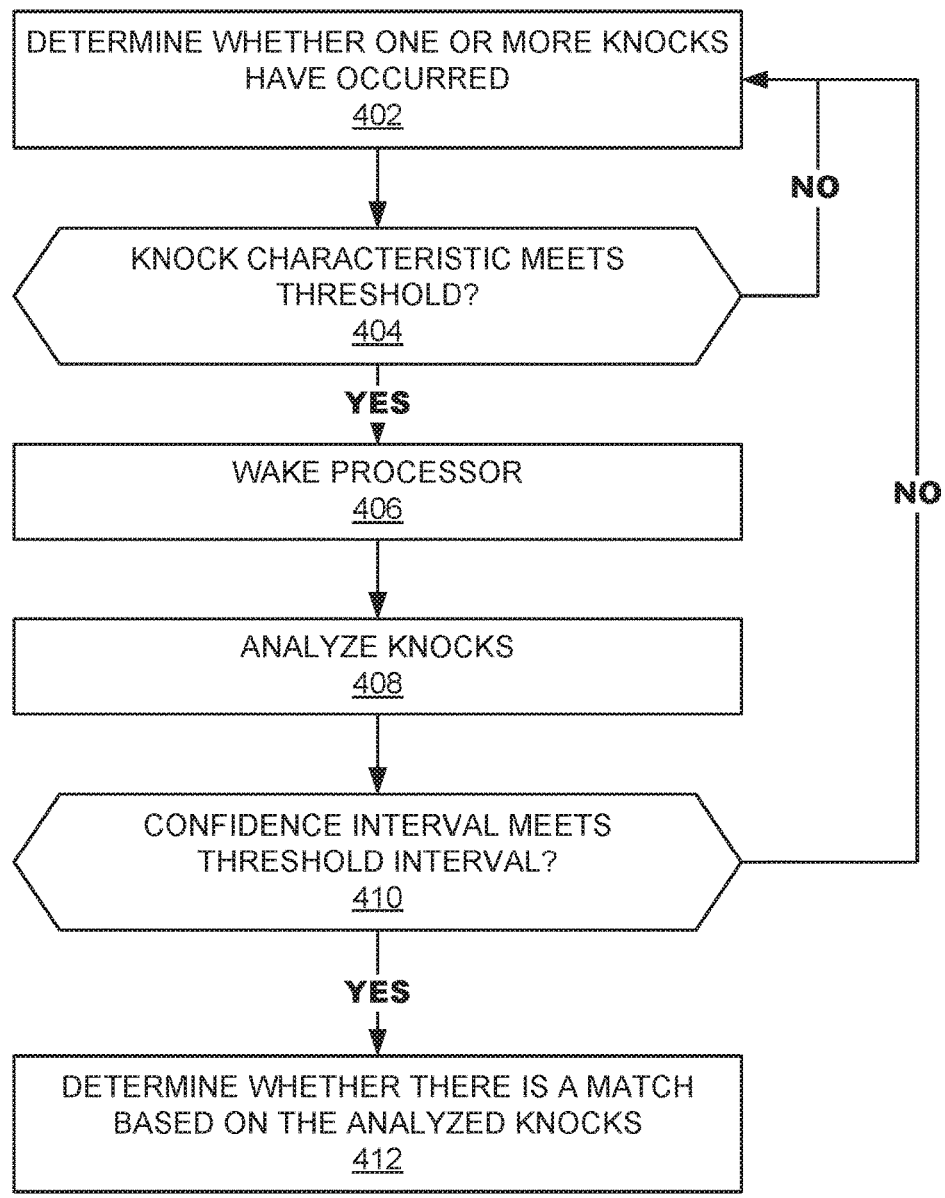
FIG. 4 is a flow chart illustrating an embodiment of a process for waking a processor based on knock analysis.
Figure 5:
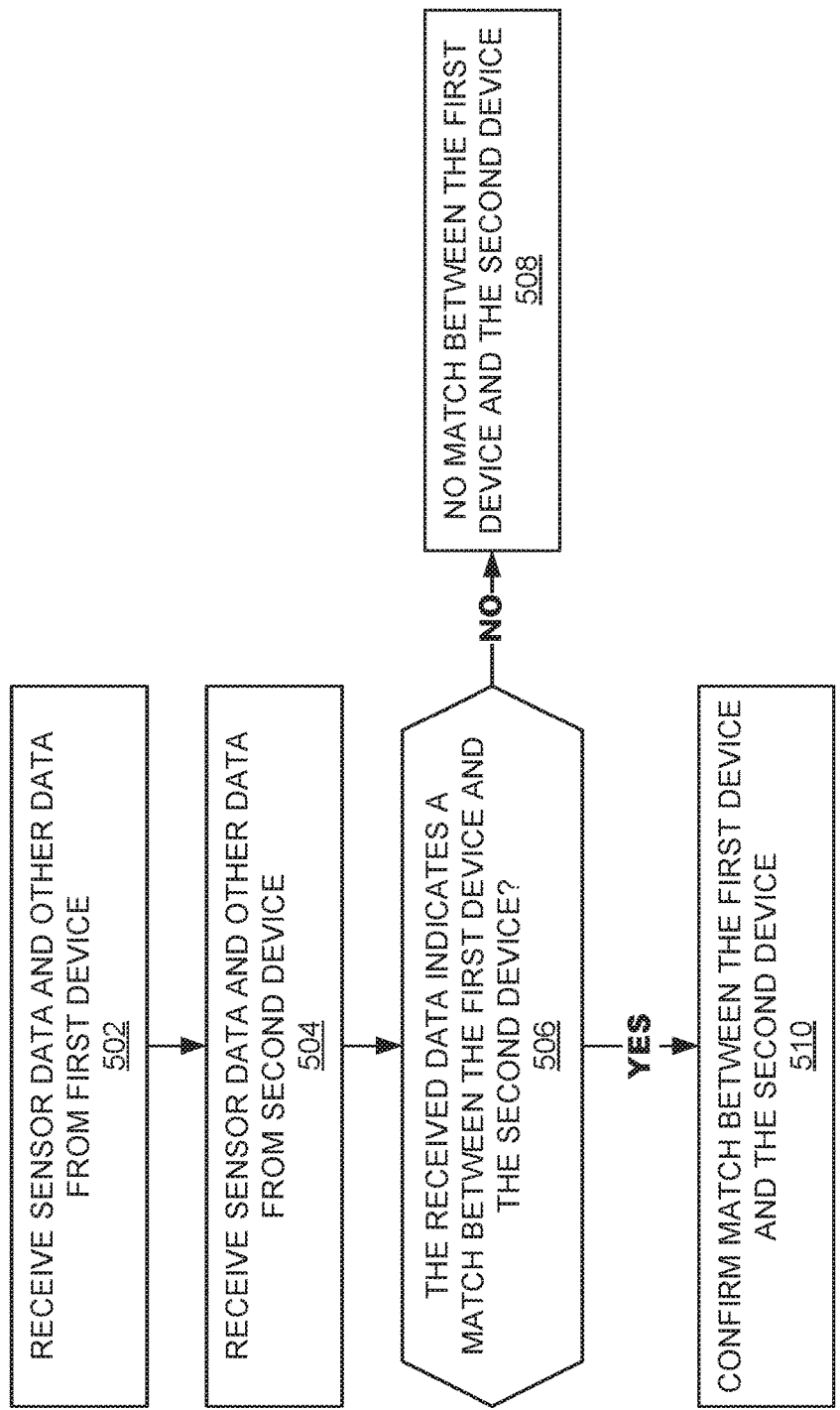
FIG. 5 is a flow chart illustrating an embodiment of a process for knock analysis.
Figure 6:
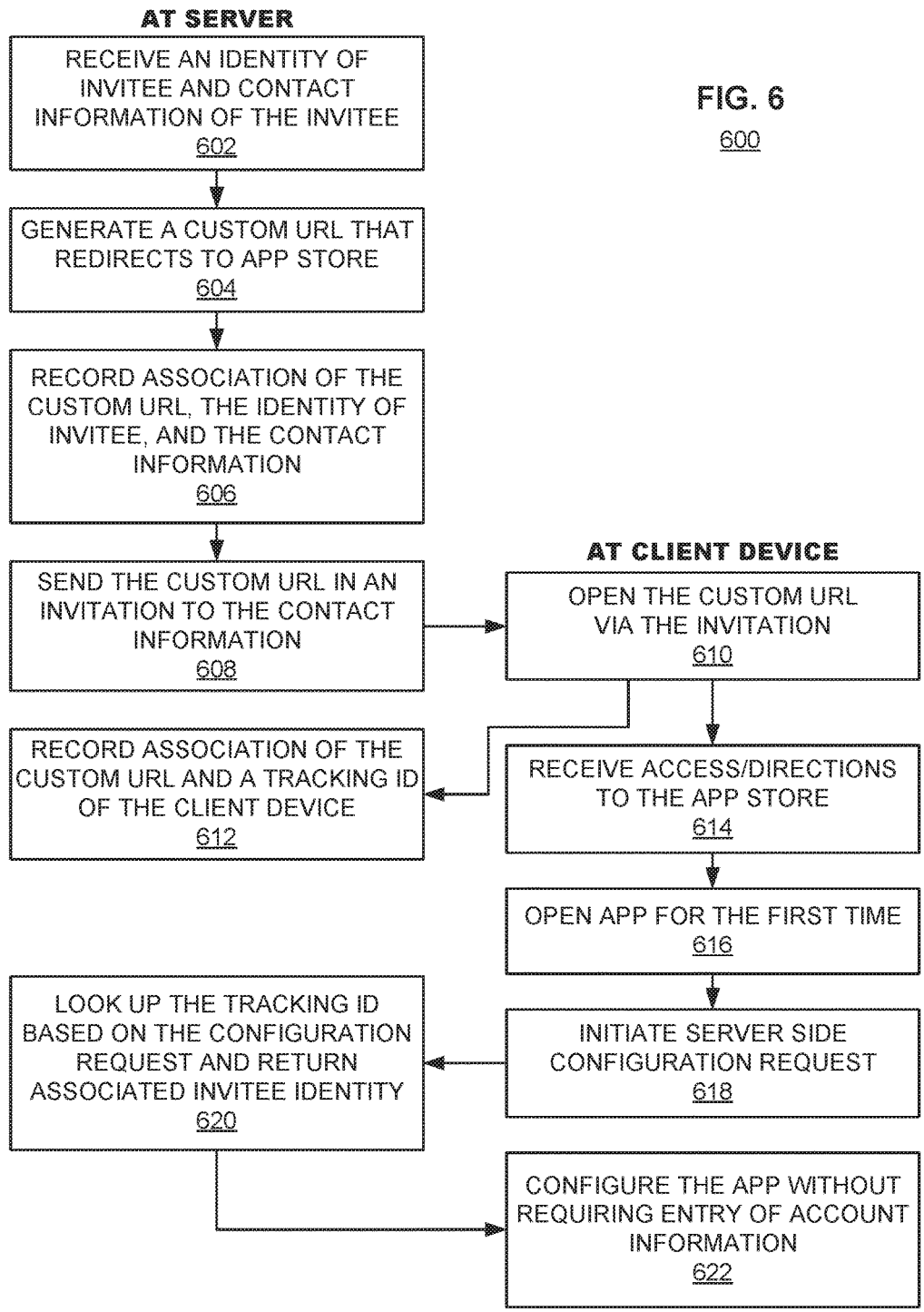
FIG. 6 is a flow chart illustrating an embodiment of a process for installing an application on a device.

At 310, the processor activates a function based on the sensor readings. For example, functions include installing an application, exchanging information between devices, sending an alert, and the like. FIG. 4 is an example of detecting knocks, FIG. 5 is determining a match between two devices, and FIG. 6 is an example of registering a device/user. Other examples of functions include detecting an emergency and sending an emergency alert, which is further described herein.

FIG. 4 is a flow chart illustrating an embodiment of a process 400 for waking a processor based on knock analysis. In some embodiments, at least a portion of the process of FIG. 4 is included in 304 and/or 310 of FIG. 3. For example, 402 and 404 may be included in 304 and 408-412 may be included in 310. In some embodiments, 402-412 may be entirely executed in the AO processor, e.g., 304 of FIG. 3. Process 400 may be implemented by a device or system such as system 100 shown in FIG. 1, system 200 shown in FIG. 2A, or system 250 shown in FIG. 2B.

At 402, the process determines whether one or more knocks have occurred. In various embodiments, a knock is a hard physical knock against the device that is detectable by one or more sensors. Example sensors are further described herein, e.g., with respect to FIG. 1. For example, knocking can be produced by contacting the device with a force meeting a threshold (e.g., tapping, hitting with the knuckles, etc.). As another example, knocking can be produced by contacting the device with another object such as hitting a first device with a second device. In some embodiments, a knock is distinguishable from a finger press or "soft" touch (e.g., a touch below a threshold or not meeting detected jerk as further described herein).

In some embodiments, a knock has occurred when a distance between two devices is below a threshold distance. The distance between the two devices may be measured by near field communications or radio frequency.

In a first example, a knock is detected based on the parameters and example values shown in Table 2 below.

TABLE 2

| Parameter | Example Value |
|---|---|
| derivative | 1 |
| thresholdMin | 1000.0 |
| thresholdMax | −1000.0 |
| minDuration | 0.0 |
| durationMax | 0.2 |
| repeatWindowStart | 0.0 |
| repeatWindowEnd | 0.0 |
| repeatCount | 1 |

A sensor-provided reading of acceleration is received. The first derivative of acceleration is taken (in Table 2, derivate value=1) to obtain jerk. If the absolute value of jerk meets a threshold or falls outside a threshold range, knock detection is triggered. When knock detection is triggered, the process listens for subsequent knocks. In this example, if jerk falls above thresholdMin (1000.0) or below thresholdMax (−1000.0), knock detection is triggered. For example, thresholdMin>thresholdMax, which test for values outside the min-max range. When detecting a knock, the process may also consider duration. In this example, a duration of between 0.0 and 0.2 seconds in length qualifies as a valid knock, i.e., jerk falling between thresholdMax and thresholdMin of duration between minDuration and durationMax qualifies as a knock. The minimum and maximum durations may be selected to eliminate events that are not knocks. For example, when a phone is dropped, jerk characteristics may look like those of knocking except the duration exceeds 0.2 seconds.

In a second example, a plurality of knocks are detected based on the parameters and example values shown in Table 3 below.

TABLE 3

| Parameter | Example Value |
|---|---|
| derivative | 1 |
| thresholdMin | 1000.0 |
| thresholdMax | −1000.0 |
| minDuration | 0.0 |
| durationMax | 0.2 |
| repeatWindowStart | 0.5 |

TABLE 3-continued

| Parameter | Example Value |
| --- | --- |
| repeatWindowEnd | 2.0 |
| repeatCount | 2 |

In this example, the process detects a two-knock minimum, i.e., repeatCount=2. If the absolute value of jerk meets a threshold or falls outside a threshold range, knock detection is triggered. When knock detection is triggered, the process listens for at least two knocks in a row. In this example, if jerk above thresholdMin (1000.0) or below thresholdMax (−1000.0), knock detection is triggered (a first knock is detected), and the process repeatedly checks for whether a second knock is made, where second knock comes between 0.5 to 2.0 seconds after the first knock, i.e., repeatWindowStart=0.5 seconds and repeatWindowEnd=2.0 seconds. The repeatWindowEnd is set to 2.0 in this example because the repeatCount is >=2. The process looks for a second knock during the repeatWindowStart and repeatWindowEnd times.

In various embodiments, sensors detect other types of events such as freefall, device is motionless on a flat surface, device is motionless on a non-flat surface, rollercoaster, crash, earthquake, and elevator ascent. In some embodiments, these events are not counted as knocks but may be useful for other applications such as sending an alert, which is further described herein.

The exemplary thresholds provided above in Tables 2 and 3 are illustrative. One of ordinary skill in the art would appreciate that thresholds may vary by device and context. In various embodiments, thresholds are programmable to improve the functioning of the processor. For example, the selection of the thresholds may increase or decrease power consumption, as further described herein.

For example, looser thresholds (e.g., a larger range as defined by a lower threshold and upper threshold) reduce the chance of missing a knock at the cost of greater power consumption. Tighter thresholds (e.g., a smaller range) increase the chance of missing a knock but reduce power consumption. In various embodiments, thresholds are continuously varied to balance power consumption against accuracy. For example, the threshold is varied according to current battery levels and likelihood of missing intended matches. When a battery level is below a threshold level, the range set by lower and upper thresholds may be tightened to reduce power consumption. When matches are expected, thresholds may be loosened to decrease the chance of missing a knock. For example, matches may be expected during a scheduled event such as a conference, where the event is obtained from a calendaring application on the device.

In various embodiments, a machine learning system may take multiple inputs, e.g., single, multiple knocks, or multiple sensor readings, to provide a fused sensor with improved accuracy. For example, systems like those described herein can be adjusted with another threshold to trade off false positive rates (triggering when no match has occurred, therefore consuming more power) to false negative rates (no trigger when a match has occurred meaning a poor user experience of a product that appears not to work). For example, for frequent, low power activities, the thresholds may be set to favor a higher false positive. This may consume more power but is less likely to miss matches. For less frequent, high power activities, the thresholds may be adjusted to reduce major expenditures of power (e.g., network connection), whilst maintaining an acceptable false negative rate (e.g., missing a match).

At 404, the process determines whether one or more knock characteristics meet a respective threshold. For example, once knock detection is triggered, the processor listen for additional subsequent knocks. For example, individual knocks are identified by an AO such as the AO 103 of FIG. 1, AO 204 of FIG. 2A, and AO 254 of FIG. 2B. In some embodiments, an individual knock is identified based on one or more trained weights from a machine learning algorithm or heuristics algorithm. In various embodiments, knocks are counted and matched to a threshold to determine whether the number of knocks meets a threshold.

If knock characteristics do not meet thresholds, the process returns to 402, in which the process continues to observe knocks and determine whether one or more knocks have occurred.

If knock characteristics meet thresholds, the process proceeds to 406, in which the process wakes a processor and/or an application. For example, the AO wakes the main processor. Waking the device may include notifying an application on the device. For example, AO 130 wakes processor 102 in FIG. 1, AO 204 wakes processor 202, and AO 254 wakes processor 252.

The knock threshold can be varied to trade off power consumption and sensitivity/accuracy. For example, a higher threshold may cause fewer wakeups, which may be better for power but is less sensitive. A lower threshold may cause more frequent wakeups, which may be better for sensitivity/accuracy but consume more power.

Consider a relatively high knock count threshold, e.g., 3 or 4 knocks for wakeup. The frequency of wakeups may be reduced significantly compared with doing wakeup on 1 or 2 knocks. This would reduce power consumption, making the device battery last longer. On the other hand, the device may fail to wake up when a match was intended. For example, suppose the threshold is 3 knocks. The device will not wake up if: (a) only two knocks are detected due to the sensor or algorithms failing to identify the third knock, (b) a person mistakenly knocking the device twice (when they intended to knock the device 3 times), among other causes.

Consider a relatively lower threshold, e.g., doing wakeup on 1 or 2 knocks. This may accidentally trigger very often, e.g. just from jostling in the pocket whilst a person is walking. A wakeup like this every 5-10 seconds may drain the battery relatively quickly.

A knock threshold may be automatically adjusted based on device state such as battery state. For example, for a device with a low battery (e.g., level below a threshold), the thresholds may be tightened, e.g. higher jerk threshold and requiring more knocks for wakeup. This reduces the chance of a "false positive wakeup" and increases the chance of "false negative wakeup". A "false positive wakeup" is when the processor is woken up when a match was not intended. A "false negative wakeup" is when the processor is not woken up when a match was intended. A false negative wakeup occurs when the app fails to recognize and confirm a match (or emergency alert) close to the time it occurred. Instead, the match may be identified minutes or hours later. When the threshold number of knocks is set relatively low (e.g., one knock), there can be many false positive wakeups because a user may unintentionally knock the mobile device once without intending to make a match. When the threshold number of knocks is set relatively high (e.g., ten knocks), there can be many false negative wakeups because a user intends to make a match but does not make the requisite number of knocks.

Where available, the sensor history (e.g., accelerometer) may be analyzed after the fact to identify "false negative wakeups". In various embodiments, this information may be conveyed to a user via a UI. For example, a message may be displayed to explain to the user how a match was missed and confirm whether a match was intended.

In various embodiments, the device may be configured to operate in a more battery-conserving capacity or mode. For example, the app may only wake up when the device is on (but does not wake up when the device is off) regardless of a number of knocks detected in 404. As another example, the app may only wake up when the device is unlocked, e.g., this may be more secure than allowing the app to wake up when the device is locked. In each of these examples, either the processor and/or the AO may be configured to implement the described behavior.

At 408, the process analyzes the knocks. In various embodiments, a server determines whether to match two devices. The server may reject a match between two devices where no match was intended. For example, the server may make a determination based on knock timing (when a knock was detected), timing between knocks, geographic proximity between two devices, and/or other factors. In various embodiments, proximity within a threshold distance and knocks matching up in time indicates a match.

Figure 10A:
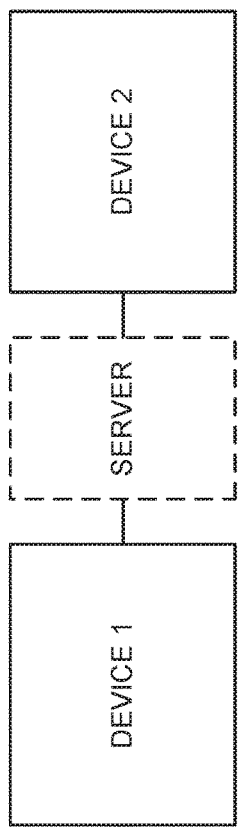
FIG. 10A is a block diagram illustrating an embodiment of a system having two devices for making a match.
Figure 10B:
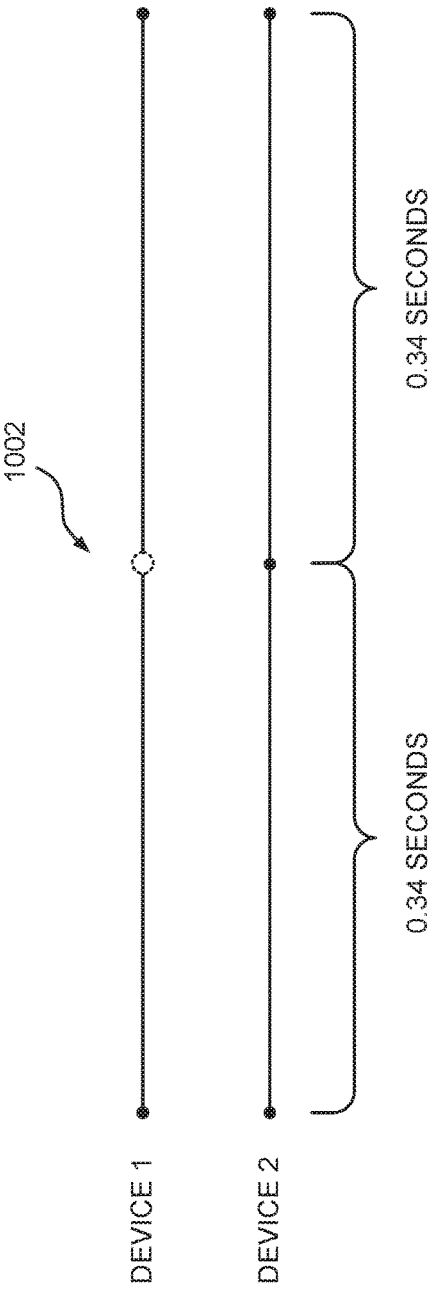
FIG. 10B is a diagram illustrating an example of knocks recorded by two devices.

In various embodiments, a match is still successful when a knock has been missed. Referring to FIGS. 10A and 10B, two devices, Device 1 and Device 2, are matched in spite of a partial information mismatch. Device 1 records 2 knocks separated by 0.68 seconds. Device 2 records 3 knocks, each separated by 0.34 seconds. FIG. 10B is a diagram illustrating an example of knocks recorded by two devices. In FIG. 10B, a recorded knock is represented by a solid circle while a knock that was not recorded is represented by a dashed circle. Since 0.34+0.34=0.68 . . . the server may assume that device 1 was knocked 3 times but missed the middle knock 1002, e.g., due to a sensor failure or other problem. In this case, a match is confirmed despite the partial mismatch. The determination of the timing of a knock is further described herein with respect to FIG. 5.

In various embodiments, the analysis of the knocks are based at least in part on machine learning. One or more factors are considered in aggregate to make a potentially more accurate determination of whether there is a match between two devices.

In various embodiments, the knock analysis may reduce a number of false positive matches and/or false negative matches. Some devices may report many "false positive matches," where the device app believes that a match may have occurred when in fact it has not. For example, a device may send 60 false matches per day (whilst correct matches happen weeks or months apart), resulting in hundreds to tens of thousands of "false positive matches" for every match that is correct.

In various embodiments, "false positive matches" may be mostly eliminated through failure to match against knocks detected by another device. In some embodiments, the goal may be to reduce "false positive matches" only so much as to reduce device battery drain, e.g., to a goal of the app using around 1% of a battery per day. In some embodiments, user experience may be prioritized over server traffic or wakeups. That is, eliminating/reducing the friction of a user being required to open the app in order to make a match is supported by relatively more wakeups and server traffic.

In various embodiments, knock analysis includes determining a confidence interval. The confidence interval may be measure of the confidence of sensors. The confidence interval may be determined by heuristics or a machine learning system. In various embodiments, the knocks may be re-analyzed by a more sophisticated machine learning system to determine the confidence interval for an intended match. A confidence interval may be determined from factors such as time, user habits, calendar entry, and other data. Selection of the confidence interval may be based on (e.g., traded off against) power consumption. If the confidence interval is not high enough, then the device may go back to sleep to wait for a further knock (e.g., a reduced number) that may materially change the confidence interval.

Alternatively, at modest confidence interval, it may gather additional data or perform further actions that uses increasing amounts of power, e.g., determine location at increasing degree of precision, peer to peer communication, Wi-Fi, or cellular communication. When a broadband chip is used for a cellular connection, the chip is often kept awake for many minutes, making it one of the more expensive actions in terms of power.

At 410, the process determines whether a confidence interval meets a threshold. If the confidence interval meets the threshold, the process proceeds to 412 in which the process determines whether there is a successful match. In some embodiments, if the confidence interval does not meet the threshold, the process determines that there is no match. In some embodiments, if the confidence interval does not meet the threshold, the process returns to 402 in which the process continues to observe knocks and determine whether one or more knocks have occurred. In some embodiments, if the confidence interval does not meet the threshold, the process simply terminates.

At 412, the process determines whether a successful match is made. When a successful match occurs, a confirmation message may be communicated to both devices. Referring to FIG. 10A, the information may be communicated peer-to-peer (without using the server shown) or from the networked server to the devices. FIG. 10A is a block diagram illustrating an embodiment of a system having two devices for making a match. In some embodiments, Device 1 and Device 2 are successfully matched according to the techniques further described herein. In some embodiments, Device 1 and Device 2 are not matched because it may be determined that they have not been attempting to make a match or one of the devices is being malicious or obnoxious.

In various embodiments, when the device receives confirmation of a match, the device may do one or more of the following: exchange contact information, e.g., email address, mobile number, and/or other data; establish a social network connection or initiate a request to do the same; record when and where a user met another user; display notification of an action to the user; allow the user to respond to the request including accept the request (optional in various embodiments); reject the request; modify the request, e.g. share more or less information than the app defaulted to, e.g., add home address, or decline to share mobile number; correct the match as being unintended or intended for another user, etc. A confirmation may include inputting identification information, providing biometrics such as via Apple Touch ID®, and the like.

In various embodiments, a match can optionally be made without an additional confirmation step (which may simplify the process). In various embodiments, the example actions may be performed on the server side, e.g., 210 of FIGS. 2A and 2B or the server of FIG. 10A.

In some embodiments, a successful match is not made. For example, a match could fail to be detected for one or more of the following reasons: one device recognizes the knock and communicates successfully with the server but the second device failed in at least one of these steps; one device has the app installed but the other device does not; one device is in a pocket or at rest on the table and not likely engaged in making a match; various metrics indicate that there is a high likelihood of intended match (e.g., both devices in a user's hand, multiple knock occur, are at a conference based on calendar/event information). In various embodiments, if the server fails to find a match, the failure may be in error. For example, the app may decide that a match was intended and the reason for the failure is that the other user did not have an app installed. If the failure was made in error, the device may determine who the other person is, for example, by looking at a calendar event, nearby friends, and/or other factors and confirm the match despite the failure.

If the app has high confidence for a particular user (e.g., a two person event where one person has an app installed and the other does not), the app may send an invitation to the person without the app. In some embodiments, a first device invites a second device to install an app. The invitation mechanism may facilitate installation of the app and streamline an authentication process. In an embodiment, a user can install the app without requiring the user to wake the device, create an account, or enter a password. Additionally, the SMS (or email) invitation may be used as a seamless verification step. An effect is that someone without the app installed allows another person to knock against their device and share the information even if the other person does not have the app installed. An example of sending an invitation and registering and/or authenticating a device is further described herein with respect to FIG. 6.

If it is ambiguous who the other person is, the app can show a notification inviting further interaction, such as: ask for identifying information such as mobile phone number, email, or business card, allow the user to select amongst a set of suggested people, or allow the user to type a name with a customized autocomplete. Information obtained during the further interaction may be used to generate an invite.

If the user selects a person of much higher social standing (e.g., popularity), the app may decline to send the invitation and instead ask the (less popular) user to ask the other person to install the app or for a piece of the more popular person's personal information, e.g., mobile number.

In various embodiments, for contact exchange, a user may configure the app to share only what the user prefers to share. For example, the app may allow users to make selections ahead of time about what to share in each context or how much to share in general. For example, a user might prefer to share professional work information at a conference, while in a personal setting, the user might want to share the user's personal mobile number.

In various embodiments, the amount of information shared may be dependent on the relative social standing and affinity of the two people. For example, when Al Gore meets a random person, he may not want to share much, if any, information. In contrast, when Mr. Gore meets a senator, celebrity, or member of his extended family, he may want to share more information. To accommodate this type of scenario, in various embodiments, the app may accurately predict what a user wants to share. In various embodiments, the data may not be transferred immediately, to give a chance for a user to change a selection or cancel sharing of information.

In various embodiments, the determination of what and how much information a user might want to share with another user is enabled at least in part by a heuristics or machine learning system. The system may consider all the data available on the user and other metrics, e.g., Twitter® view count, Facebook® reputation, contact numbers the user already has, and/or other factors. User responses to cancel or modify the match may be used to train the machine learning system.

FIG. 5 is a flow chart illustrating an embodiment of a process 500 for knock analysis. In some embodiments, at least a portion of the process of FIG. 5 is included in 408 of FIG. 4. Process 500 shown in FIG. 5 may be implemented by a device or system such as server 210 shown in FIGS. 2A and 2B.

At 502, sensor data and other data is received from a first device. At 504, sensor data and other data is received from a second device. The sensor data and other data received from the first device and the second device may include information about timing of knocks. In one aspect, obtaining a sufficiently precise clock synchronization between devices allows for more accurate comparison of knocks between devices. Since accelerometers typically sample at 100 hertz (every 10 milliseconds), synchronizing the device clocks to about the same level of accuracy, i.e., within 10 milliseconds would yield more accurate results. In various embodiments, this is done by each device estimating an offset, "device time offset" between the device clock and "atomic time" as defined by a highly accurate reference clock.

When the app is started (or when there is an active network connection), a plurality of Simple Network Time Protocol (SNTP) requests are initiated by the app to get an accurate time from a server driven indirectly by an atomic clock. The longer this response takes, the more inaccurate the device is. The app discards outliers in the server responses that take too long or timeout. Remaining responses are averaged to generate a difference between the device clock and the atomic time. This difference is called the "device time offset."

When the device reports knock data to the server, it includes a relative difference between device clock and atomic time, along with any accuracy information. At the server, the "device time offset" is added to the knock time data to obtain a more accurate time. This calculation may also be performed on the device. In an alternative embodiment, a full NTP system (instead of a SNTP client) may be run on the device. In an alternative embodiment, a network time as provided by one of the emerging "internet of things" standards may be used.

FIG. 6 is a flow chart illustrating an embodiment of a process 600 for installing an application on a device. As shown, a portion of process 600 may be implemented by a server such as server 210 of FIGS. 2A and 2B and a portion of process 600 may be implemented by a client device such as client device 200 of FIGS. 2A and 2B.

At 602, an identity of an invitee and contact information of the invitee are received. For example, the app (at the request of a user/inviter) initiates a request to the server with identification and contact information. The contact information may be a mobile phone number, an email address, a screenname, and the like. In various embodiments, the invitee is a person to be invited to install an app, register with a matching system, and/or make a match with a user who is already part of the matching system or who already uses the app. In some instances, the invitee's contact information is provided by an existing user. In some instances, the invitee's contact information is completed with autocomplete. For example, the inviter enters the first few letters of the invitee's name and the app autocompletes a suggested invitee's name.

At 604, a custom URL is generated that redirects to an app store. For example, the app store is a platform on which apps are available for purchase and/or download. In some embodiments, the custom URL links to a web page which sets a cookie to store an identity of the invitee.

At 606, an association of the custom URL, the identity of the invitee, and the contact information of the invitee is recorded. In various embodiments, this information allows the invitee to be identified again during the app setup.

At 608, the custom URL is sent in an invitation to the contact information. In various embodiments, the custom URL is sent as part of an invitation. In various embodiments, the invitation to install the app contains a custom URL specific to the invitation. The invitation can be in the form of SMS, email, or other mechanism. The server may determine the best communication channel (e.g., whether text is better than email for a particular user) and then sends that invitation. Alternatively, the app can create a draft invitation that the user then sends directly from their own device, typing in the contact information of the recipient.

At 610, the custom URL is opened via the invitation. In various embodiments, a client device opens the custom URL in response to user selection of the URL via a user interface/display screen of the client device. In some embodiments, this may create a client-side cookie on a web page before directing the user to the app store installation page.

At 612, an association of the custom URL and a tracking ID (or fingerprint) of the client device is recorded. In various embodiments, the tracking ID (or fingerprint) is a unique identification of the client device and may include one or more of the following information: IP and MAC address, user device information (e.g., OS version), user agent (string), web cookie, information obtained via JavaScript request such as a screen size of the device, a clock offset of a device, and the like.

At 614, access and/or directions to an app store is received. In some embodiments, this may be an automatic redirect without requiring any user action. The access/directions may be for installation of the app. In various embodiments, the access/directions is accompanied by a tracking code. For example, the tracking code may allow for analytics of installation and usage characteristics of the app. For example, the webpage redirects the user's browser to a native install for that device operating system, e.g. the App Store® or Google Play™ store for that specific app. In various embodiments, the app is automatically installed on the device without requiring entry of account information. In various embodiments, upon installation, the application is automatically launched.

In an alternative embodiment, where the app is pre-installed at device manufacture or pre-installed as a library in another app, when the app has high confidence (e.g., meeting a threshold confidence level) that a match is intended, without the step of confirming that communications be made with the network server or the other device, it can then prompt the user. In various embodiments, the app prompts the user for at least one of: permission to make the match, permission to continue to operate, and offering to disable further operation.

At 616, an app is opened for the first time. In various embodiments, when an app is opened for the first time after installation, process 600 proceeds to 618 in which the device initiates a server-side configuration and the server proceeds to provide the invitee identity and account setup information. For example, when the app is opened, the app initiates a network request reporting previously reported information (e.g., a tracking ID such as IP and MAC address, user agent, screen size, web cookie, and/or clock offset). In various embodiments, 616 refers to the first time an app is opened after a most recent installation. For example, a device may have previously had the app installed and opened but was later refurbished or the app was uninstalled.

At 618, a server side configuration request is initiated. In various embodiments, the server side configuration request is made with the tracking ID of the client device. For example, typically, the same IP address recorded at 612 is seen again at 618.

At 620, the tracking ID is looked up based on the configuration request and return associated invitee identity. For example, the server then attempts to match the information received from the app for a particular device against the invitation previously sent to the device. This identifies the user (invitee) for which the invitation was intended.

At 622, the app is configured on the device without requiring entry of account information. In various embodiments, if the recipient was confirmed with sufficient confidence (e.g., as measured against a threshold), then when opened, the app will welcome a user by name without requiring a login. That is, a user need not enter a username and/or password combination when the app is launched. This advantageously saves time and makes interaction with the app more seamless.

In various embodiments, when a first successful match is made, the app will explain itself to the user and offer to make a match. At the same time, it will offer to disable itself. For example, the app displays a message on a graphical user interface. If the app does not have sufficient permission to actively use the network, then the app can listen in a passive mode. In various embodiments, in the passive mode, the app does not communicate with a server and instead listens/records device signals such as sensor input, Bluetooth®, near field communications, and other signals from nearby devices. In some embodiments, when there is a relatively high confidence of an intended match, the app may prompt a user to configure the app and give the app permissions to exit passive mode and communicate with a server. The information observed during the passive mode may then be transmitted to the server. This mode prevents external communication, e.g. network, peer to peer, thereby ensuring complete privacy.

In some embodiments, process 600 is performed on a device that already has pre-installed code such as a pre-installed software development kit (SDK). For example, if the device already has pre-installed code, process 600 begins at 614 in which the client device receives access/direction to an app store. In various embodiments, a device includes pre-installed non-transitory machine-readable instructions ("pre-installed code") to assist the download and installation of an app. In some embodiments, the pre-installed code is the full app.

In some embodiments, the pre-installed code includes a portion of code included as part of another app or service. For example, a user may be prompted at initial setup of the mobile device, or as part of the terms of service (TOS) for permission for the app or service to operate. Upon making the first match, the app prompts the user to install the full app.

In conventional systems, an invitation mechanism may not always be reliable and can be cumbersome. For example, a user is prompted to enter information (e.g., username, payment details, etc.) as part of the download and installation process. The burden of searching for an app in an app store, providing information prior to downloading the app, downloading the app, and/or providing additional information when opening the app for the first time prevents a user from adopting the app for regular use. Techniques of the present disclosure alleviate the inconvenience and encourage use of the application by providing a more seamless experience at the initial stages of downloading and using an application.

Here, user experience is improved by minimizing user input such as typing, clicking, and tapping in the install. Each step is intuitive and does not require any user input. For example, a user experience is as follows: a click to open an SMS (or email) containing a customer URL. A click to open the custom URL. A click to confirm install of app. A click to open app. The app then welcomes the user by name, explains the match was made (and allows the user to edit if needed), and explains how to use the app.

In various embodiments, a match between devices is made using a peer-to-peer connection. Peer-to-peer matching may potentially be a faster, more reliable, and power efficient form of communication to make a match between devices. Peer-to-peer matching does not require network connectivity. Examples of peer-to-peer connections include Bluetooth®, Bluetooth LE®, infrared, Wi-Fi Direct®, and the like.

In various embodiments, peer-to-peer connection may be the default communication for sufficient confidence after wakeup to economize on power by avoiding the power cost of using network connectivity. If the confidence is higher (or peer to peer fails), then the app may escalate to network communication.

Figure 7:
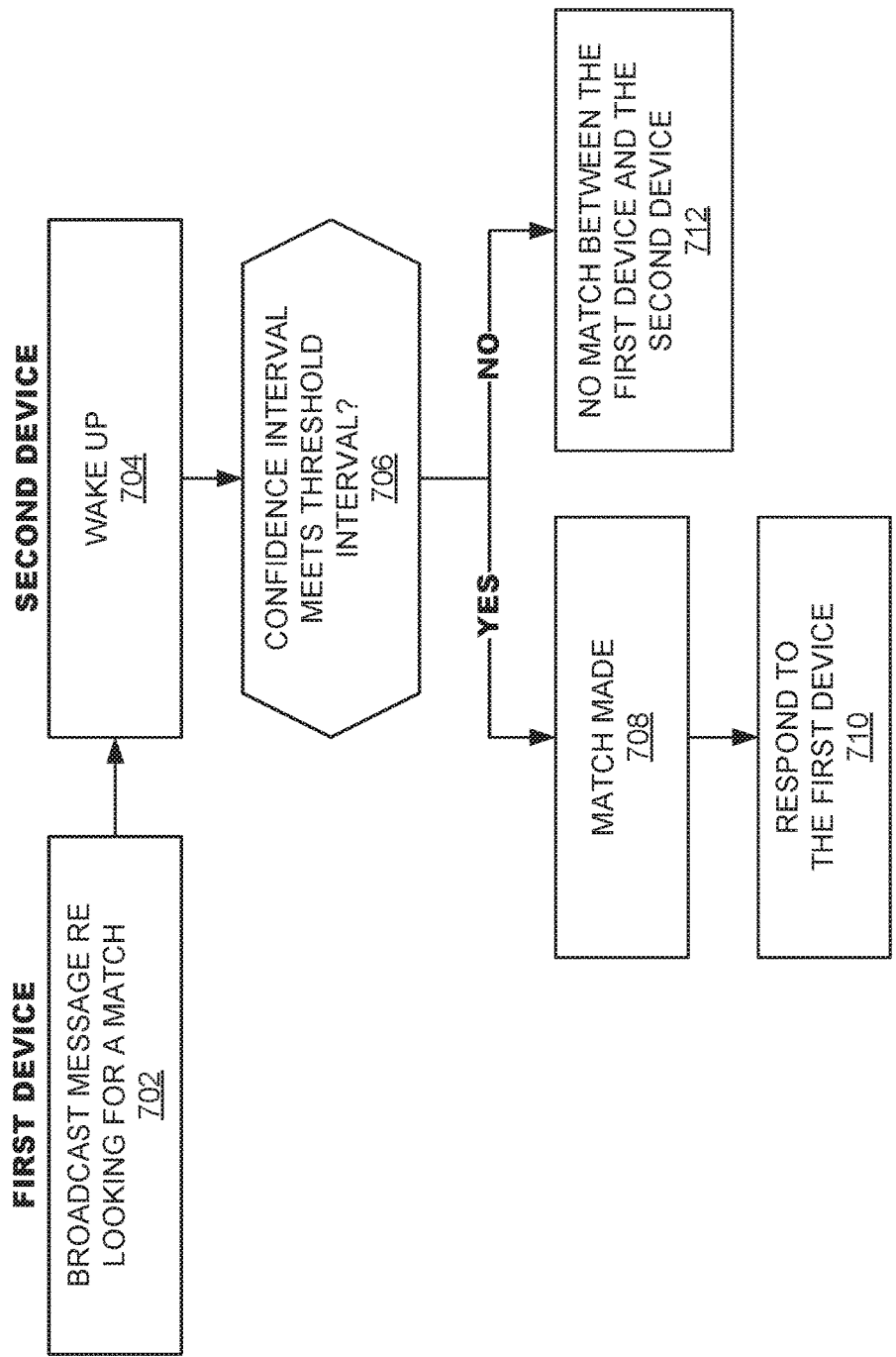
FIG. 7 is a flow chart illustrating an embodiment of a process for making a match based on a peer-to-peer connection.

FIG. 7 is a flow chart illustrating an embodiment of a process 700 for making a match based on a peer-to-peer connection. Process 700 may be implemented by a device of system such as system 100 of FIG. 1, system 200 of FIG. 2A, or system 250 of FIG. 2B.

At 702, a first device broadcasts a message that the first device is looking for a match. For example, the first device believes a match may have occurred and is looking for a match. The first device may believe a match occurred based on knock detection and analysis, e.g., as described in FIG. 4. In various embodiments, the signal may cause one or more nearby devices to wake up (704).

In various embodiments, communication, including the broadcast of 702, is signed for the first device using a server-provided token, which may be periodically rotated for additional security. For example, messages may be encrypted with a rotating key that is periodically updated through an app, to prevent other apps spoofing broadcasted messages. Communication may include reputation tokens signed by the server that indicate relative importance of a user, e.g. is this person very important or well known (e.g., a celebrity).

If the app on the second device has a sufficiently high confidence interval that a match has occurred (706), then it will respond to the first device (708). Otherwise, if the confidence interval does not meet the threshold, the second device determines that a match is not made (710). An example of confidence interval determination is 410-412 of FIG. 4

Referring to FIG. 7, a first device ("Device 1") broadcasts a message, a second device ("Device 2") wakes in response to the broadcast, determines whether a confidence interval meets a threshold interval. If the confidence interval meets a threshold interval, a match is made between Device 1 and Device 2. Device 1 and Device 2 may proceed to exchange information in various embodiments. If one of the devices (e.g., Device 2) does not yet have an app installed, the device may execute an installation process in cooperation with the Server, e.g., according to FIG. 6.

FIG. 8 is a flow chart illustrating an embodiment of a process 800 for waking a processor in a device without an always-on processor. Process 800 may be implemented by a device or system such as 100 of FIG. 1 (without AO 103).

At 802, sensor history is recorded continuously. For example, a device may be configured to sample sensor history at a pre-defined frequency, e.g., 50 hertz or greater than 100 hertz throughout a day (24-hour time period).

At 804, the process determines whether criteria for waking a processor is met. In various embodiments, the criteria includes an event such as a threshold elapsed time (e.g., 3 minutes), etc. That is, the processor wakes periodically. In various embodiments, the criteria includes an event such as a sensor buffer being flushed. Unlike processes for devices with an AO, instead of waking upon a knock event, the processor may be woken when a sensor buffer is flushed or when some period of time has elapsed (e.g. every 3 or 30 minutes). If a criterion or criteria are met, the processor proceeds to 806, in which the processor is woken. Otherwise, the processor returns to 802 in which sensor history continues to be recorded periodically.

At 808, the process determines whether there is a possible match. In various embodiments, a knock detection process (e.g., described with respect to FIG. 4) is run to determine whether there is a possible match. If a possible match is detected, then network activity is triggered to verify the match (810). In some embodiments, when network activity is triggered, match-related information is transmitted. Information collected earlier (before triggering of the network activity) may be analyzed to determine a confidence of a match. Otherwise, if a possible match is not detected, the process returns to 802 in which sensor history is recorded. In various embodiments, for cases in which no possible match is detected, the application may nevertheless record all the sensor history.

The triggering of network activity may include activating or initiating a network connection to communicate with a remote server. When a network activity is triggered, a current possible match and other recent possible matches are transferred to a server (812). For example, the other recent possible matches may be those possible matches with a lower probability of a match compared with the current possible match. For example, in various embodiments, other recent possible matches are those matches within a pre-defined time period that did not meet a threshold to trigger network activity earlier. This allows verification of matches that might have been missed earlier.

In various embodiments, when the device battery is above a threshold (e.g., close to full, charging at night, etc.), the device can engage in a transfer of the complete sensor history to a server. When the device battery is above the threshold, the relatively power expensive transfer of the sensor history will not affect device battery performance. In various embodiments, using the complete sensor history, more sensitive server side processing (compared with device-side processing) may detect possible matches. This may detect some matches that were previously missed. The matches that were previously missed may have been missed due to a network connection being down or inconsistent, e.g., WiFi® connection failed.

Process 800 may be combined with the processes described herein for device with an AO. For example, the process 800 and the other techniques described herein may be combined such that the chance of a fast match through always-on processing is maximized and the chance of missing a match is minimized, even if that match is discovered late.

In one aspect, the embodiments described herein improve power consumption of mobile devices by, among other things, waking a processor at a desired time and activating a functionality without turning on a mobile device screen. The embodiments described herein improve security of making matches by automatically sending and/or installing an application on a mobile device. The techniques described herein also improve usability of mobile devices including user experience.

In another aspect, devices share information more securely and easily compared with conventional techniques. For example, information is automatically shared without requiring a user to unlock or wake the device in a traditional manner. The examples described here are for waking a processor and activating a functionality to share contact information or to send an emergency alert. These techniques also find application in other situations in which a processor is woken and a functionality is activated.

FIG. 9 is a flow chart illustrating an embodiment of a process 900 for preventing a technological attack. Process 900 may be implemented by a device or system such as system 100 shown in FIG. 1, processor 202 shown in FIG. 2A, or processor 252 shown in FIG. 2B.

At 902, the process makes a peer to peer broadcast. An example of a broadcast is 702 of FIG. 7. The broadcast may be a query about making a match. For example, a first device broadcasts a message that it is looking to make a match with a second device.

At 904, the process receives responses. Responses may be transmitted by devices in response to the broadcast. The responses may be transmitted directly to the device that made the broadcast or via a central server. The response may include a request to make a match by a second device to a first device.

At 906, the process determines whether a single response is received or whether multiple responses are received. If a single response is received, the process proceeds to 908 in which the request is validated. In an alternative embodiment, the process indicates that the response is likely valid without validating the request. For example, the request is further processed prior to being ultimately validated. If a single other device responds with a match, then there is a lower chance of malicious interception.

If multiple responses are received, the process proceeds to 910 in which the process determines whether any of the responses are suspicious. A response may be determined to be suspicious as follows.

In an embodiment, if none of the responses are suspicious, the process proceeds to 912 in which the device compares the matches and determines a best match (912). In some embodiments, the process then validates the request corresponding to the best match (918). In various embodiments, a match is validated by determining whether timing information and other sensor data (e.g., geographical proximity) match. For example, closer sensor readings may yield a higher confidence of a match. An example of request validation is knock analysis 408 of FIG. 4. In an alternative embodiment, the process indicates that the request corresponding to the best match is likely valid without validating the request. For example, the request is further processed prior to being ultimately validated.

If at least one response is suspicious, the process proceeds to 914 in which each suspicious response is marked. For example, the user corresponding to the device from which the suspicious response is received is marked so that the process treats the user with greater scrutiny compared with devices that did not send suspicious responses.

At 916, the process prompts for confirmation of the request. For instance, if a user corresponding to the device that sent the suspicious response is marked as suspicious, the process implements additional safety measures. In various embodiments, the prompt includes displaying a request to the broadcasting user asking for manual confirmation with a notification and or opening the app on their device. In various embodiments, the prompt includes asking the suspicious user for more information or action. For example, the suspicious user is asked to communicate with the broadcasting user for the broadcasting user to perform a manual confirmation by installing or opening the app. The suspicious user may be asked to input confirming information such as mobile phone number, email, or scanned business card. The information (or business card scan) can be used to verify that the trusted person intended a match. This either confirms a match or sends an invitation to the broadcasting user to confirm the suspicious user.

In various embodiments, the system is configured to prevent matches being made by malicious software or users. For example, to prevent matches from being made by malicious users, two devices exchange encrypted information about a possible match, including timing information and sensor readings. After the information is exchanged between the two devices, an encryption key is sent to decode the data. This means that the data sent to a device can't be manipulated after data is sent from a device. If the timing information and other sensor data matches, then it can be more confident of a match. Devices that attempt many matches or have tokens with low reputation will have matches denied since they are more likely to be malicious. This example may be extended to more than two devices attempting a match. In various embodiments, a device is configured to defend against a passive technological attack.

In some embodiments, the device defends against the passive technological attack as follows. Suppose Eavesdropping Eve is attempting to eavesdrop on a match being made between a first device and a second device. Communications to a network server are encrypted, preventing any collection of information. For a peer to peer communication, a device advertises partial knock information as a potential match. The information is encrypted with a shared key across all instances of the app. When a second device responds to the first device, e.g., indicating a possible match, the communication is encrypted with a session-specific non-shared key. From that point onwards, all device to device communication is encrypted with the unique non-shared key that Eve is unable to decrypt.

This prevents Eve from obtaining much information. She may be able to discern that a match is made by ongoing traffic analysis but she cannot gain access to the data shared between the first device and the second device, e.g. email, phone, or the like. In other words, at most, in the stage in which a device advertises partial knock information as a potential match, Eve may reverse-engineer a copy of the app to obtain the shared key. This allows her to passively eavesdrop on the initial communications and see match attempts. However, when the second device responds to the first device, the communication going forward is encrypted and Eve is unable to eavesdropping on any information shared between the first device and second device thereafter.

In various embodiments, a device is configured to defend against an active technological attack. Suppose Malevolent Mallory is attempting to actively attack a match being made between a first device and a second device. Mallory may attempt to disrupt, eavesdrop or surreptitiously intercept a match for themselves ("man in the middle attack"). Typical peer to peer connections are sensitive to these types of attacks because a trusted network server is not used. When the peer to peer broadcast is made, the device waits to hear back from one or more parties that believe that they may match (this could include Mallory).

In some embodiments, the device defends against the active technological attack as follows. For communications with a server, on the server side, a reputation of the user is formed. For example, the user's historical usage habits are recorded. High rates of matches (e.g. more than 1 request every second) by the user indicates that the user is likely malicious. Whether a rate of a matching is high may be defined by an adjustable threshold. For example, the threshold is lowered (e.g., the system is more cautious) to accommodate various situations. A user with other indicators such as a short history, little contact information, none or few prior successful matches may be measured against with a lower threshold compared with a more established user. Other Denial of Service (DOS) protection approaches may also be used.

For peer to peer communications, in some embodiments, a continuously refreshed security token signed by the server is used on the device. The security token may be periodically refreshed at a rate that balances security (more frequent) with computational cost (less frequent). For example, the security token is refreshed every 24 hours, as connectivity permits. The more stale the security token, the less the token is trusted.

The signed token may include a built-in reputation score based on how popular the user is and their successful match history. In one aspect, the reputation score represents a social standing of the user (e.g., a celebrity is more popular and has a higher score). For example, a user who is more likely to be targeted, e.g. a celebrity, has a higher reputation score and will be better protected. In some instances, it is anticipated that a celebrity connecting with a celebrity of similar stature is more likely to be legitimate. Thus, a match between two users with similar reputation scores is more likely to be legitimate. If a match attempt is made between a celebrity and a less trusted person (possibly Mallory), then the match with assessed with higher scrutiny and less likely to be authenticated.

In some situations, Mallory uses the microphone to listen to the knock sounds and use that information to pretend to have a matching set of knocks. This introduces at least two tell-tale signatures from Mallory: (1) she is delayed in her response by having to wait for successive knocks, and (2) she does not know how far away the sound is and therefore how much the observed knock has been delayed. Therefore, Mallory's knock timestamps and atomic clock offset are likely inaccurate. The incremental exchange in a peer to peer system prevents Mallory from intercepting the data and immediately purporting an exact match. Instead, Mallory untruthfully reports a match with the first knock and provides data for a second knock. The original device, which did not share the second knock data, can then compare this data to known true information about the second knock.

In addition to the technological security measures, the process of performing the additional safety measures would dissuade Mallory from completing the match. That is, a legitimate suspicious user is more likely to follow through with these actions while Mallory is less likely to follow through due to social conventions or restricted access to the more trusted person. For example, she may feel awkward asking the celebrity for this information and indeed the celebrity is less likely to give it to her.

In various embodiments, a device is configured to defend against a non-technological attack. Suppose Obnoxious Oscar is attempting to make an unwelcome match with a user "Alice." For example, Oscar is in a bar and attempts to make a match with Alice, but Alice does not want to receive and/or provide any information. Oscar may attempt an unwelcome match by knocking Alice's device without her permission. For example, Oscar could knock a device that Alice has placed on the table, take possession of Alice's device and knock his device against her device, knock a device when it is on Alice's person. In some instances, Oscar successfully completes making the requisite number of knocks for a match. In some instances, Alice is able to intercede before Oscar succeeds in making the request number of knocks for a successful match.

In some embodiments, a device defends against the non-technological attack as follows. The device, in cooperation with a server (e.g., client device 200 with server 210 shown in FIGS. 2A and 2B) assesses the probability of a non-technological attack based on various factors. By way of non-limiting example, these factors include a location where the match is made, users involved in the match, the location of the device (e.g., in a user's pocket), whether the device is in a user's possession, and/or whether the device is motionless (e.g., sitting on a table). The location where the match is made may indicate the likelihood that a match is intended. For example, if a device's location is a bar, matches are assessed with higher scrutiny because this location may make obnoxious matches more likely. As another example, if the device's location is a conference, matches are assessed with lower scrutiny because more matching and fewer malicious actors are expected in this setting. The users involved in the match may indicate the likelihood that a match is intended.

As described herein, a user may have an associated reputation score, and a match between a user with a relatively high reputation score and a user with a relatively low reputation score may be subject to higher scrutiny. For example, if a user is a repeat user of the service, or trusted due to other factors (e.g. having friends in common with Alice), then a match is granted despite otherwise suspicious circumstances.

The location of the device with respect to a user may indicate the likelihood that a match is intended. For example, if a device is inside a user's pocket at the time knocks are detected, this indicates that the match is unwelcome because a user would typically remove the device from a pocket and perform the knocks out in the open. Whether the device is in a user's possession may indicate the likelihood that a match is intended. For example, APIs such as those provided by Android® indicate whether a user is in possession of the device. If the user is not in possession of the device and knocks are detected, there is a high likelihood that another user produced the knocks without the user's permission and, correspondingly, the match is unwelcome. Whether the device is motionless (e.g., sitting on a table) may indicate the likelihood that a match is intended.

Upon detecting an unwelcome match, the app and/or server may take precautionary measures. In various embodiments, one or both devices are prompted for manual confirmation rather than making an automatic match. The manual confirmation may include inputting identification information, providing biometrics such as Apple Touch ID®, and the like. In various embodiments, a match is made but only partial data is exchanged. The remainder of the data is deferred until later when the match is determined to be a welcome match. For example, only a first name and/or initials are exchanged as a placeholder. Later, when Alice unlocks the device, the app prompts Alice to confirm the acceptance. At that time, the remainder of match information is sent to Oscar. The partial information that is initially shared includes only information that the user is comfortable with.

In various embodiments, a machines learning system trains on the factors described herein.

In various embodiments, the techniques described herein find application in detecting and reporting an emergency. Referring to FIG. 3, the analysis of the received sensor readings (304) may include determining whether an emergency is indicated by the sensor readings. The activation of a function based on the sensor readings (310) may include sending a notification regarding the emergency.

In various embodiments, the analysis of the received sensor readings (304) includes determining whether the number of sensed knocks meets a threshold indicating an emergency. For example, the threshold may be 7 knocks, 10 knocks, or more knocks.

Since users might not accurately count the knocks, the app may trigger for any number of matches beyond the threshold. In various embodiments, the user need not precisely count the number of knocks because it may be difficult to produce an exact number of knocks in a stressful situation. Instead the device will trigger when the knock count is met or exceeded. For example, an alert on 7 knocks will still trigger if a user miscounts and knocks 12 times.

In some embodiments, several thresholds may be set to indicate varying levels or types of emergencies. For example, varying the number of matches can indicate the severity of the emergency, e.g., 7 knocks for "caution," 12 knocks for "emergency," 20 knocks for "severe emergency." Each of the levels or types of emergency may trigger a different action. For example, "caution" may cause a message to be sent to a friend, "emergency" may trigger a notification to campus patrol, and "severe emergency" may summon emergency personnel.

A number of knocks in this range (at least 7-10 knocks) advantageously decreases the number of false alarms because it is less likely for a user to inadvertently produce such a relatively high number of matches. At the same time, a plurality of knocks can be quickly and conveniently produced by the user. In one aspect, false alarms for emergency alerts are relatively costly (e.g., alerting emergency services such as an ambulance, notifying/summoning a friend, and the like). In another aspect, if contact matching is triggered by 2-3 knocks, then false triggers may be caused by a lower number of knocks.

In various embodiments, in response to detecting an emergency and waking a processor, the process sends a notification of an emergency (310). The notification may be provided in various formats to various recipients. For example, the alert is sent to only friends, sent to a stranger if a friend is not nearby (e.g., user is traveling in a foreign country), and/or emergency services. In some embodiments, the notification automatically alerts emergency services, bypassing other mechanisms and not requiring the user to call 911. The notification may be accompanied with additional information to help locate and identify the user. For example, the additional information includes a likelihood of a false alarm, a location of the user, and a picture of the user.

The process optionally provides feedback to the user. In some embodiments, the feedback is provided prior to sending a notification of the emergency. In some embodiments, the feedback is provided after sending a notification of the emergency. For example, the feedback confirms that a friend, stranger, and/or emergency services have been notified and may offer other advice which the user is waiting for help to arrive.

The feedback may be audio, visual, haptic, or another form of feedback. In some embodiments, the device vibrates to acknowledge the alert. In some embodiments, the device varies the type of feedback provided to the user based on the type of emergency alert received. For example, as the number of knocks increases and/or a more severe emergency is indicated, the process provides increasingly noticeable alerts including, e.g., haptic feedback, a visual prompt on a screen of the device, a low volume audible alert, a high volume audible alert.

In various embodiments, an unintended alert may be canceled by a user. For example, when feedback is provided on a user interface, the user may cancel the alert via the user interface. When feedback is provided to the user and the message times out without receiving a user response, then the emergency notification is sent.

In one aspect, an app need not be opened and a device need not be unlocked or even turned on to issue an alert. The alert may be made by knocking against the device in a user's pocket, without even removing the device from the pocket. For example, if a user is experiencing an assault, the user need not to divert his or her eyes. The user may simply alert with one hand by knocking the device or may alert without hands by knocking the device against another object. Thus, the alert may be made in a discreet manner, allowing the user to perform other tasks while sounding the alarm. For example, the user may run or move while knocking the device. It is also simple for a user to remember how to issue an alert.

The knocking and waking mechanism may include one or more error checking measures. The error checking measures advantageously prevent the processor from waking and/or a functionality from being activated. This may conserve power consumption, and, in emergency alert situations, prevent emergency services from being inundated with notifications when a disaster occurs. For example, in a disaster situation, emergency services may be provided a manner different from typical emergency responses (e.g., first aid is distributed to each neighborhood at a time rather than responding to individual emergency calls). Suppose every user in the city suddenly alerted at the same time upon an earthquake, where some alerts are unintentional. The emergency services would be overwhelmed by notifications, and have difficulty prioritizing the users.

For example, in an earthquake, the frequency response of earthquakes (~1 hertz) can trigger false knocks. Using the examples provided herein, a network connection might not be intended during an earthquake and/or an emergency alert might not be intended. In various embodiments, the system is configured to monitor for these situations and guards against them. For example, when a series of knocks lasts longer than typical with great regularity (e.g., missing the variation expected from other intended/unintended interactions), then a functionality would not be triggered by the knocks. The system may also monitor earthquake reports from other sources, (e.g. other devices or the U.S. Geological Survey) and then dismiss alerts (or matches) that appear to be due to the earthquake. The system may determine that an alert was due to the earthquake based on the timing of the knocks coinciding with the earthquake and/or the regularity of knocks received.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for determining a match between two devices, comprising:
   receiving sensor data and other data from a first device;
   receiving sensor data and other data from a second device;
   determining whether the received sensor data from the first device and the received sensor data from the second device indicates a match between the first device and the second device;
   responsive to a determination that there is a match between the first device and the second device, confirming the match wherein the match is confirmed based on at least one of: analysis of at least one knock, missing information, and a characteristic of a user of the first device or a user of the second device;
   receiving an identity of an invitee and contact information of the invitee;
   generating a custom URL, wherein the custom URL redirects to an app store;
   recording an association of the custom URL, the identity of the invitee, and the contact information of the invitee; and
   sending the custom URL in an invitation to the contact information.

2. The method of claim 1, wherein:
   the received sensor data from the first device includes data indicating the at least one knock;
   the received sensor data from the second device includes data indicating the at least one knock; and
   the confirmation of the match includes allowing exchange of information between the first device and the second device.

3. The method of claim 1, wherein:
   the contact information is one of: a mobile phone number and an email address, and
   the invitation is one of: an SMS message and an email message.

4. The method of claim 1, further comprising, in response to receiving a request from a client device, recording an association of the custom URL and a tracking ID of the client device.

5. The method of claim 4, wherein the tracking ID is an IP address of the client device.

6. The method of claim 4, further comprising, in response to receiving a configuration request, looking up the tracking ID based on the configuration request and returning an associated user identity.

7. A method of activating a function, comprising:
   receiving at least one sensor reading;
   recording the at least one sensor reading;
   analyzing the received at least one sensor reading, wherein the analysis includes determining whether at least one knock has occurred based on the received at least one sensor reading;
   determining whether to activate the function based on the analysis;
   responsive to a determination that the function should be activated, activating the function;
   responsive to activating the function, determining whether there is a possible match between two devices based on the recorded at least one sensor reading; and
   responsive to a determination that there is a possible match, triggering network activity and transferring at least one of a most recent possible match and other possible matches.

8. The method of claim 7, wherein the activation of the function includes performing a second function by a processor.

9. The method of claim 7, wherein the analysis of the received at least one sensor reading further includes:
   determining whether a number of knocks meets a threshold; and
   responsive to a determination that the number of knocks meets a threshold, determine that the function should be activated.

10. The method of claim 9, wherein the activated function includes sending an emergency alert.

11. The method of claim 7, wherein the activation of a function includes determining whether there is a match between a first device and a second device.

12. The method of claim 7, wherein the activation of the function includes:
    determining a first confidence interval for at least one knock;
    determining whether the first confidence interval meets a first threshold interval;
    in response to the first confidence interval meeting the threshold interval, communicating with at least one of: (i) a server and (ii) another device via a peer-to-peer network; and
    determining whether there is a match between two devices based on the response from the other device or the server.

13. The method of claim 12, wherein the activation of the function includes determining that a second confidence interval meets a second threshold interval and the determination of whether there is a match between the two devices is based on the second confidence interval meeting the second threshold interval.

14. The method of claim 7, wherein the activation of a function includes at least one of: communicating with a remote server, broadcasting a message to a peer-to-peer network, and listening in a passive mode.

15. The method of claim 14, further comprising:
    receiving at least one response to the broadcast;
    responsive to receiving a single response, validating a match request based on the single response;
    responsive to receiving a plurality of responses, determining whether any of senders of the plurality of responses is suspicious;
    responsive to a determination that none of the senders of the plurality of responses is suspicious, determining a best match and validating a request corresponding to the best match; and
    responsive to a determination that at least one of the senders of the plurality of responses is suspicious, at least one of: send a challenge response to the at least one sender and displaying a query for validating information.

16. The method of claim 7, wherein the at least one sensor reading is recorded continuously and, in response to activating a function, transfer the continuously recorded sensor readings to a remote server.

17. The method of claim 7, further comprising:
    receiving a request to open a custom URL, wherein the custom URL is provided by a remote server;
    sending a request and tracking ID to the remote server;
    receiving access directions to an app store;

responsive to an initial request to open the app, making a configuration request to the remote server;

receiving account information from the remote server; and configuring the app without requiring entry of account information.

18. A system for activating a function, comprising:

a processor configured to:

receive at least one sensor reading;

record the at least one sensor reading;

analyze the received at least one sensor reading, wherein the analysis includes determining whether at least one knock has occurred based on the received at least one sensor reading;

determine whether to activate a function based on the analysis;

responsive to a determination that the function should be activated, activate the function;

responsive to activating the function, determine whether there is a possible match between two devices based on the recorded at least one sensor reading; and responsive to a determination that there is a possible match, trigger network activity and transfer at least one of a most recent possible match and other possible matches; and a memory coupled to the processor and configured to provide the processor with instructions.

* * * * *